|     |     |     |
| --- | --- | --- |
| United States Patent [19] | [11] Patent Number: | 4,720,596 |
| Kissinger et al. | [45] Date of Patent: | Jan. 19, 1988 |

[54] PROCESS FOR REMOVING PHENOLS FROM WATER

[75] Inventors: Gaylord M. Kissinger; Isabel M. Gomes de Matos, both of Evansville, Ind.

[73] Assignee: General Electric Company, Mt. Vernon, Ind.

[21] Appl. No.: 940,243

[22] Filed: Dec. 9, 1986

[51] Int. Cl.$^4$ .................................................. C07C 37/70
[52] U.S. Cl. ................................... 568/724; 568/748; 568/749
[58] Field of Search ....................... 568/724, 748, 749

[56] References Cited

U.S. PATENT DOCUMENTS

| | | | |
|---|---|---|---|
| 2,042,331 | 5/1936 | Carswell | 568/750 |
| 2,339,388 | 1/1944 | Engel | 568/750 |
| 4,180,683 | 12/1979 | Mitchell | 568/724 |
| 4,209,646 | 6/1980 | Gac | 568/724 |
| 4,294,993 | 10/1981 | Li | 568/749 |
| 4,492,807 | 1/1985 | Aneja | 568/724 |

FOREIGN PATENT DOCUMENTS

| | | | |
|---|---|---|---|
| 0207543 | 3/1984 | German Democratic Rep. | 568/749 |

*Primary Examiner*—Werren B. Lone
*Attorney, Agent, or Firm*—Martin B. Barancik

[57] ABSTRACT

A process for removing phenol from water which comprises contacting a phenol bearing water stream with a bisphenol-A melt thereby separating phenol from the water.

4 Claims, No Drawings

PROCESS FOR REMOVING PHENOLS FROM WATER

BACKGROUND OF THE INVENTION

The dihydric phenols have achieved significant success in their commercial applications. The dihydric phenols are used in the commercial manufacture of various polymers including the polyarylates, polyamides, epoxies, polyetherimides, polysulfones and the polycarbonates. Significant attention has been directed to the commercial preparation of the dihydric phenols. For many years it was well known that the acid catalyzed reaction of phenol with a specific aldehyde or ketone would prepare the 4,4'-dihydric phenol with specific groups derived from the aldehyde or the ketone connecting the two phenolic rings. In order to make certain polymers, in particular the polycarbonates, the dihydric phenol must be particularly pure as well as the process particularly efficient since the dihydric phenol cost contributes substantially to the cost of the final polymer. A significant amount of by-product water is formed in many, if not all, of these processes. In order to recycle the water or discharge to a waste treatment facility, it should be as clean as possible of various contaminants which are also prepared in the process. One of the usual contaminants of the by-product water in the dihydric phenol processes is the starting phenol.

It has now been found that phenol can be effectively removed from the aqueous by-product stream accompanying the process. This removal is accomplished by using specific reagents already present in most, if not all, of the dihydric phenol commercial processes.

SUMMARY OF THE INVENTION

In accordance with the invention there is a process for removing phenol from water which comprises contacting a phenol bearing water stream with a bisphenol-A melt and separating therefrom water purified from phenols.

A further aspect and advantage of the invention is recovering water from the bisphenol-A melt through removal of the phenol water azeotrope.

A still further aspect and advantage of the invention is recovering phenol from the bisphenol-A melt by contacting the bisphenol-A melt with nitrogen under desorbing conditions.

DETAILED DESCRIPTION OF THE INVENTION

As used in the specification and claims the term "bisphenol-A melt" means molten bisphenol-A with a sufficient amount of water to reduce the melting point of bisphenol-A to that which can be readily handled in the process and preferably below 100° C. Bisphenol-A melt generally has 10 to 15 weight percent water so as to lower the composition melting point of pure bisphenol-A, 156.8° C., to a readily manageable 98° C. When phenol is also present as in this process during the contacting of the dihydric phenol melt with the phenol contaminated water, the phenol also reduces the melting point of the bisphenol-A melt substantially, to approximately 60° C.

In order to understand the process better, the process will be explained in more detail with respect to bisphenol-A and phenol per se. Bisphenol-A is prepared from the condensation of phenol and acetone under acidic conditions. The water stream contaminated with phenol is drawn off. Bisphenol-A melt is contacted with the water stream so as to form a separate organic and aqueous phase. These two phases are generally contacted at a minimum temperature, generally above about 60° C., usually about 65° C. and below or equal to about 99° C. The two streams are then separated. The distribution coefficient between water and bisphenol-A melt with respect to phenol is quite high and therefore allows the partition to occur efficiently with the phenol becoming associated with the bisphenol-A thereby eliminating the need of an organic solvent. It is contemplated that when using large quantities of materials as in a pilot plant or a commercial process that the two streams would be contacted in a countercurrent liquid/liquid extraction process in a columnar apparatus. The number of "plates" in the liquid/liquid extraction column is dependent upon the purity desired of the water. Some water is also associated with the bisphenol-A melt. The bisphenol-A melt can be then purified of the additional water by removal of the phenol-water azeotrope from the recirculated melt stream by heating. The extra phenol is desorbed from the bisphenol-A melt by contact with nitrogen under specific conditions. Such conditions for example include nitrogen desorption in a packed and heated apparatus suitable for the down flow of bisphenol-A/phenol melt, hydraulically filled, while nitrogen is upflow through the liquid carrying the phenol out for condensation.

Below are examples of the invention. These examples are intended to exemplify the scope of the invention rather than constrict it.

EXAMPLE 1

A 200 g solution of 10% phenol in water was heated to 95° C. 110 g of bisphenol-A (BPA) was added to the solution and stirred. After the BPA had melted, agitation continued for approximately 10 minutes. The solution was allowed to separate into two phases, the upper being aqueous and the lower being organic. Samples for high pressure liquid chromatography (HPLC) analysis were taken of both.

Below are the results of the HPLC analysis:

|  | 1st EXTRACTION | |
|---|---|---|
|  | AQUEOUS | ORGANIC |
| Phenol | 2.27 | 10.91 |
| BPA | 2.38 | 77.05 |
| Distribution coefficient (K) | 4.81 | |

As is observed from the favorable distribution coefficient, further phenol can be removed from water by multiple stage contacting with BPA melt.

What is claimed is:

1. A process for removing phenol from water which comprises contacting at least a portion of a phenol bearing water stream which results form the acid catalyzed condensation of phenol with acetone with a bisphenol-A melt thereby separating phenol from the water.

2. The process in accordance with claim 1 wherein the process is carried out between about 60° and 99° C.

3. The process in accordance with claim 1 wherein further water is recovered from the bisphenol-A melt through removal of a phenol water azeotrope from the said melt.

4. The process in accordance with claim 1 wherein phenol is removed from the bisphenol-A melt by contacting the said melt with nitrogen under desorbing conditions.

* * * * *